(12) United States Patent
Tomlinson et al.

(10) Patent No.: US 6,976,106 B2
(45) Date of Patent: Dec. 13, 2005

(54) METHOD AND APPARATUS FOR SPECULATIVE RESPONSE ARBITRATION TO IMPROVE SYSTEM LATENCY

(75) Inventors: Jay S. Tomlinson, San Jose, CA (US); Chien-Chun Chou, San Jose, CA (US)

(73) Assignee: Sonics, Inc., Mountain View, CA (US)

( * ) Notice: Subject to any disclaimer, the term of this patent is extended or adjusted under 35 U.S.C. 154(b) by 387 days.

(21) Appl. No.: 10/286,721

(22) Filed: Nov. 1, 2002

(65) Prior Publication Data

US 2004/0088458 A1 May 6, 2004

(51) Int. Cl.[7] .............................................. G06F 13/36
(52) U.S. Cl. ..................................... 710/113; 710/107
(58) Field of Search ................................ 710/107–108, 710/113–119

(56) References Cited

U.S. PATENT DOCUMENTS

| | | | |
|---|---|---|---|
| 5,388,245 A * | 2/1995 | Wong | 711/118 |
| 5,845,097 A * | 12/1998 | Kang et al. | 710/117 |
| 5,933,610 A * | 8/1999 | Chambers et al. | 711/113 |
| 5,948,089 A | 9/1999 | Wingard et al. | |
| 6,182,183 B1 | 1/2001 | Wingard et al. | |
| 6,330,225 B1 | 12/2001 | Weber et al. | |
| 6,578,117 B2 | 6/2003 | Weber | |
| 6,763,415 B1 * | 7/2004 | Tischler | 710/240 |
| 2003/0074520 A1 | 4/2003 | Weber | |
| 2003/0156597 A1 * | 8/2003 | Eberle et al. | 370/447 |

* cited by examiner

*Primary Examiner*—Tim Vo
(74) *Attorney, Agent, or Firm*—Blakely, Sokoloff, Taylor & Zafman LLP

(57) ABSTRACT

A method and apparatus for speculative response arbitration to improve system latency have been described.

17 Claims, 8 Drawing Sheets

METHOD AND APPARATUS FOR SPECULATIVE RESPONSE ARBITRATION TO IMPROVE SYSTEM LATENCY

FIELD OF THE INVENTION

The present invention pertains to arbitration. More particularly, the present invention relates to a method and apparatus for speculative response arbitration to improve system latency.

BACKGROUND OF THE INVENTION

In existence today there are examples, in which there are multiple bus agents that are trying to gain access to a shared resource, such as the system bus or another type of interconnect. In order for an agent to be granted the right to use the shared resource, the initiator must first make a request to gain access to the system bus. Then, the arbitration circuit considers all of the access requests and makes a determination as to which agent will be granted access to the shared resource. In order for an agent to be granted access to the system bus, it must first request access. It is possible for there to be times in which there is not any agent that wants to use the system bus. When this condition occurs, there may be a default winner, which may be required to hold the current value or to create an Idle bus cycle on the system bus. The default winner is fixed and will always be the same agent. The default winner can receive a grant even when it did not first request access. This may present a problem.

An example of this type of situation may be illustrated using the system as shown in FIG. 1. This system consists of bus agents, 100, 101, 102, and 103. These agents communicate via a system bus 200. In order for a transfer across the system bus 200 to occur, an agent (such as a bus agent 100) must first request access to the bus (such as the system bus 200) from the arbiter 300. The agents communicate to the arbiter over the request/grant interfaces 400, 401, 402, and 403. One example of a timing diagram is shown in FIG. 2. Here it can be seen that a request from Agent 100, occurs in one cycle (clock cycle 0), and then on a subsequent cycle a grant may be received that enables the agent's transfer to occur. FIG. 3 shows the case when none of the bus agents 100, 101, 102, nor 103 are requesting access to the system bus and the arbiter gives the default grant 310 to Agent 100 which is then required to put out an idle bus cycle 320.

One problem with this approach shows up when an interconnect must span large distances thereby requiring an additional delay in order to transfer information such as the arbitration request or the resultant grant of the system bus. Since a grant must always be preceded by a request the best-case performance of the system will be reduced by this additional delay both to make the request and to receive access grant notification. FIG. 4 shows an example of a case in which Agent 101 is ready to transfer at cycle 1 but must wait for a delay in order to first issue the request 410 and then receive the grant 420. This presents a problem as some system requirements may not be able to tolerate this amount of additional delay for best-case performance.

BRIEF DESCRIPTION OF THE DRAWINGS

The invention is illustrated by way of example and not limitation in the figures of the accompanying drawings, in which like references indicate similar elements and in which.

DETAILED DESCRIPTION

A method and apparatus for speculative response arbitration to improve system latency are described.

Figure 1:
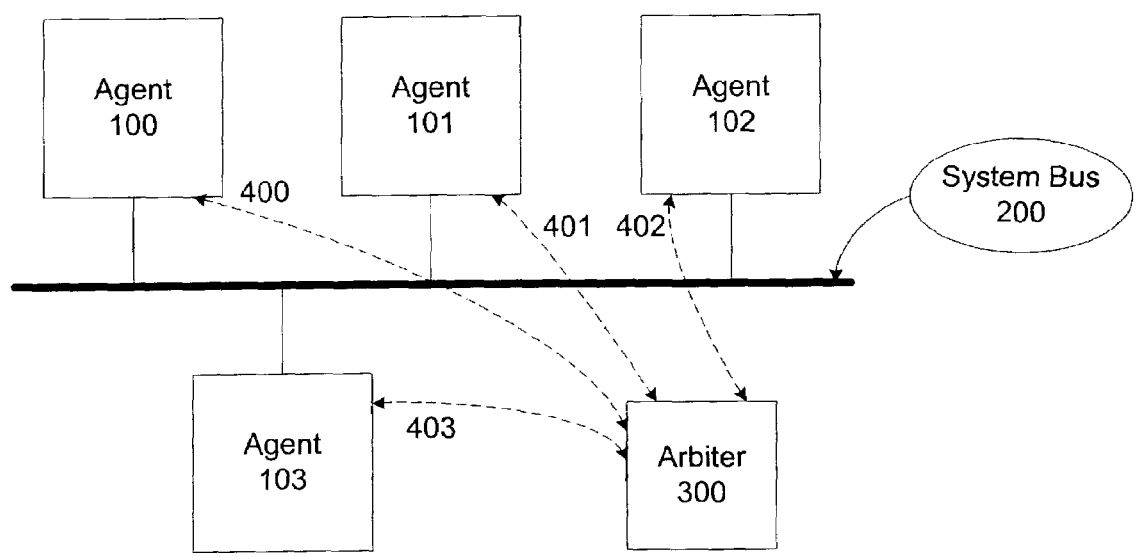
FIG. 1 illustrates a system environment for explaining prior techniques and illustrating one embodiment of the invention.
Figure 2:
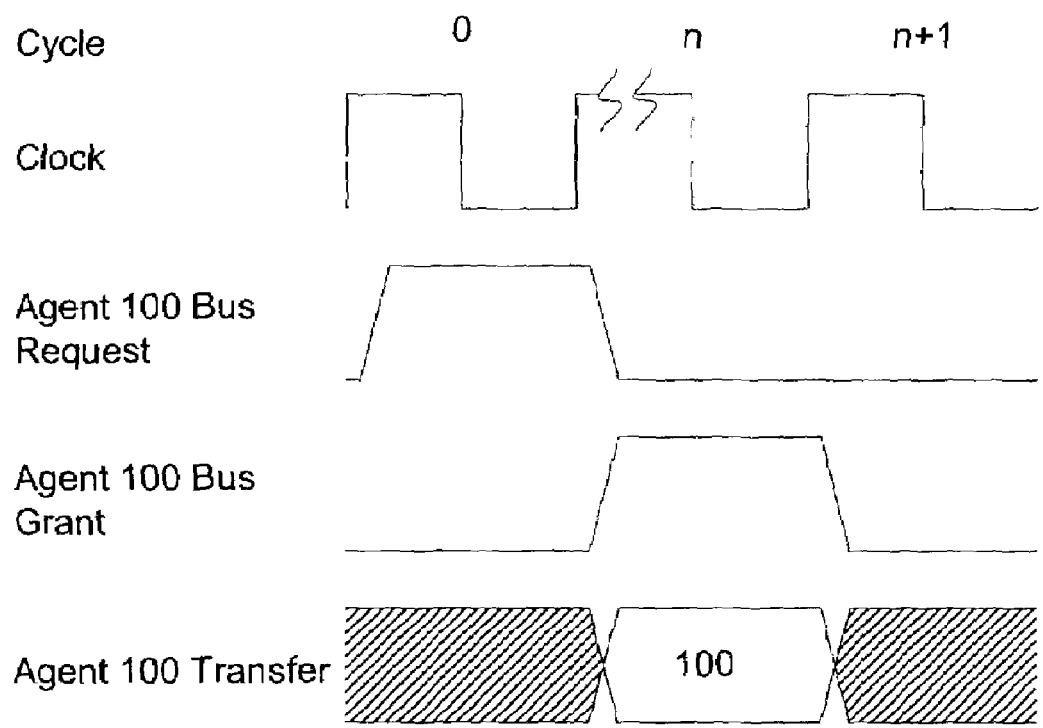
FIGS. 2–4 illustrate request/grant cycles of prior techniques.
Figure 3:
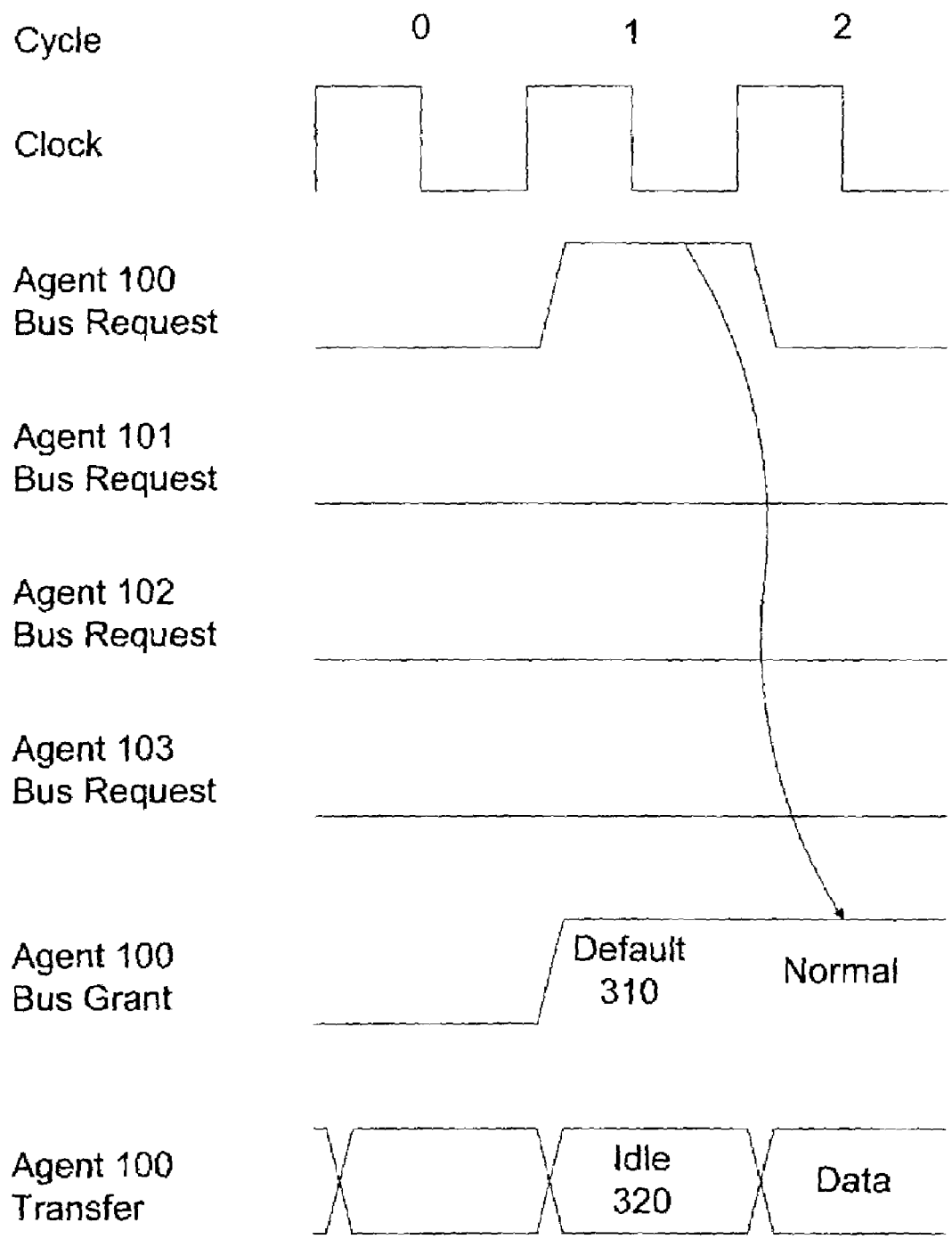
Figure 4:
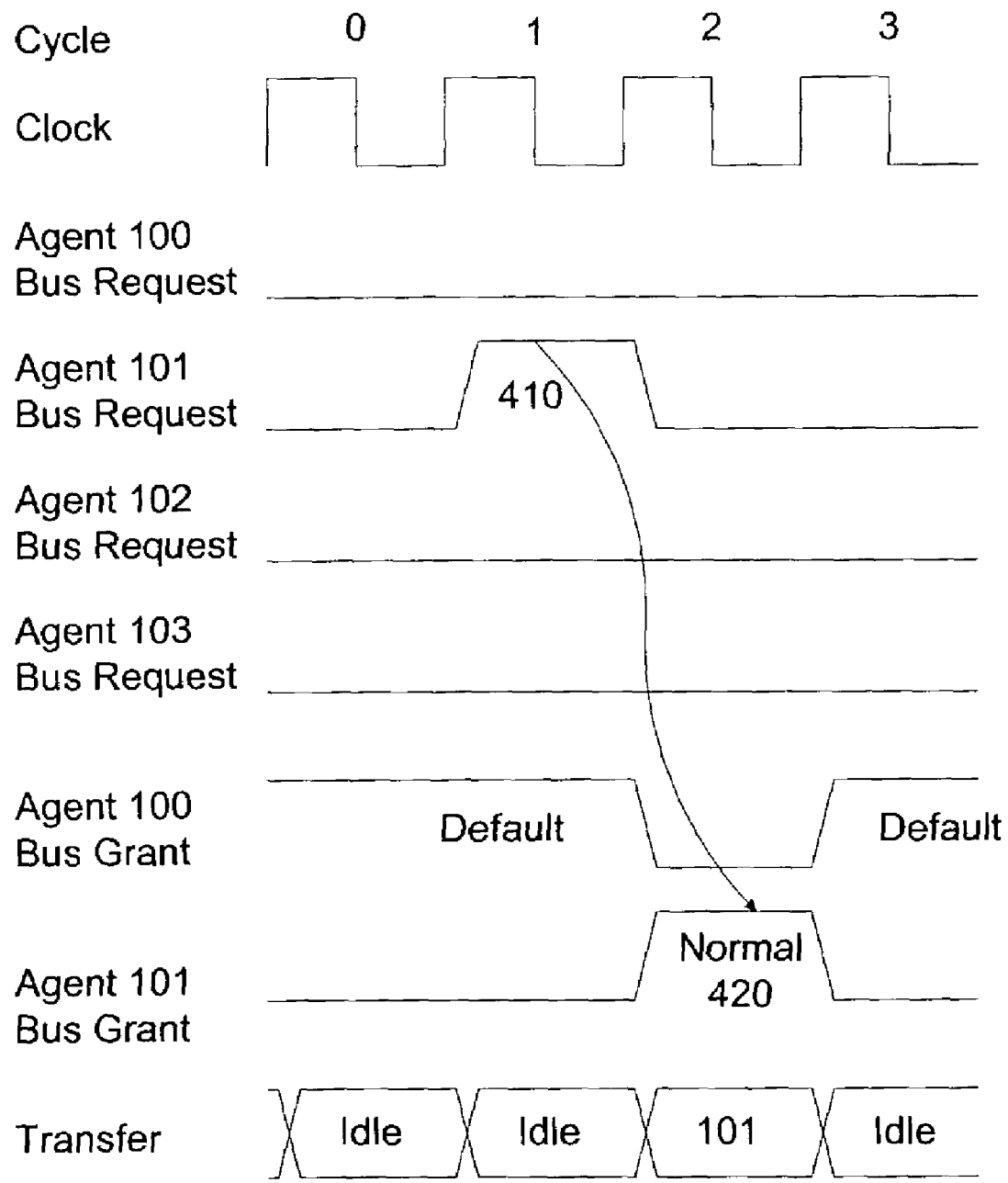
Figure 5:
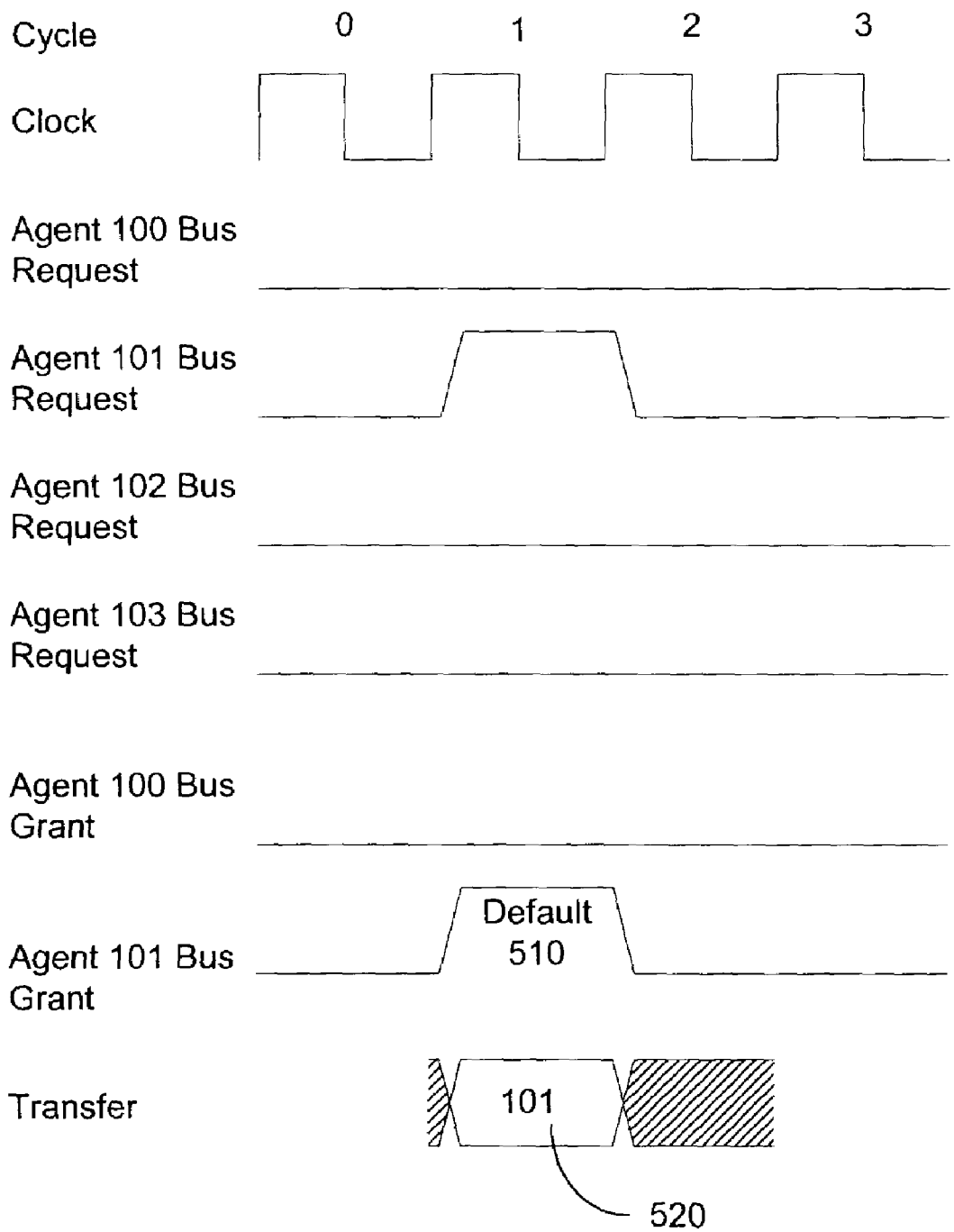
FIG. 5 illustrates in timing diagram form one embodiment of the invention.

In order to reduce the amount of additional delay due to the necessity to span large distances, an alternative approach is used in one embodiment of the invention. Instead of having a fixed default winner of the bus; the arbitration circuit in one embodiment of the invention dynamically makes a speculative decision about which entity should be given the default bus grant. The speculative decision algorithm may use internal information such as the most likely unit to request access next. Other examples of possible speculation criteria are a) expected or known delay between a request to an specific entity and the response from that entity for requests that have responses; b) knowledge about which entities are expected to send a response in reaction to requests that have been sent or are about to be sent; c) for write-type commands the speculation decision could be based upon expected or known delay between request information and the write data for a request; d) other expected or known system requests that are occur as a reaction to others. Using this approach, one is able to remove the restriction that a system bus access request must always precede a system bus grant. An agent that has been speculatively granted access will be able to use this granted access immediately and would not have to incur the additional delay required to first request access to the system bus. FIG. 5 shows an example of this case. Here Agent 101 is speculatively granted the bus 510 and is able to perform its transfer immediately 520 instead of having to first make a request and then wait for the grant as was illustrated in FIG. 4. The ability to transfer immediately as shown in FIG. 5 reduces system latency.

Some systems use a split transaction type of system bus. Systems of this type typically have bus agents that initiate requests (called initiators), to other bus agents that are the target of the request (called targets) which then respond with the result of the request. An example of such a request and response pair is in a system with a shared memory. For example, an initiator agent may request data from the shared memory. When the shared memory has the requested data ready, it will request access to the system bus so that it can return the data to the initiator that requested it. Since a request was made to the shared memory, the arbitration circuit now knows that the shared memory will eventually request access to the system bus. The arbitration circuit can use this knowledge to give the default grant to the shared memory so that it may possibly save extra delays by not having to first make a request.

Figure 6:
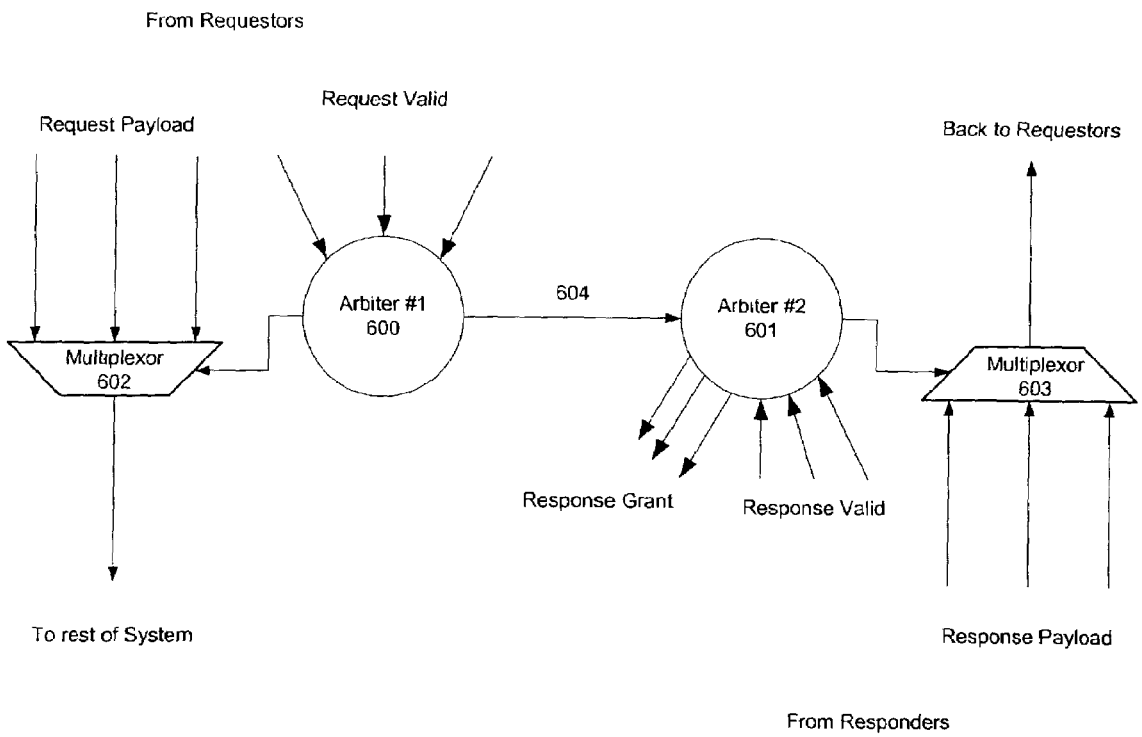
FIG. 6 illustrates in block diagram form one embodiment of the invention.

FIG. 6 illustrates another embodiment of the invention. In this embodiment in a system, there are two arbiters 600 and

601. Arbiter #1 (600) is responsible for selecting one of the competing request payloads to be sent to the rest of the system (via multiplexor 602). Any request that is issued to the system will be followed by a response from the destination of that request some time later. It is possible in this system for there to be multiple requests outstanding to which a response is still due. When a responder has a response ready, it will send a 'Response Valid' signal to Arbiter #2 (601). Arbiter #2 (601) is responsible for selecting one of the competing responses (via multiplexor 603) and notifying the responder that its request was selected via a 'Response Grant' signal. Assume because of the distance from requesters to responders involved in this system, a full cycle is required in order to communicate the 'Response Grant' back to the responder following a 'Response Valid'. At times the 'Response Grant' can be signaled by Arbiter #2 (601) prior to reception of the 'Response Valid' signal. This can occur because when Arbiter #1 (600) selects a request to be sent, it may also use information from that request to inform Arbiter #2 (602) via signal(s) 604. Arbiter #2 (601) is then able to use signal(s) 604 to possibly speculatively pre-select a response and notify the responder via 'Response Grant'. Therefore, when the responder signals 'Response Valid' the 'Response Grant' will already be asserted and a cycle of latency will be saved.

The examples given are for illustration purposes only. They are not meant to indicate the only possible usages. Other example approach could involve from 1 to an arbitrary number of arbiters that communicate to each other via 1 to many, many to 1, or many to many mechanisms. It is also possible that the arbiters communicate information in a daisy chain or cascading way such that one arbiter sends information to bias a 2nd arbiter's decision which in turn biases a 3rd arbiter and so on. It is also possible for there to be both 1-way and 2-way communication in which 1 arbiter only biases other arbiters or biases other arbiters and can be biased by others.

Thus, what has been disclosed is a method and apparatus for speculative response arbitration to improve system latency.

Figure 7:
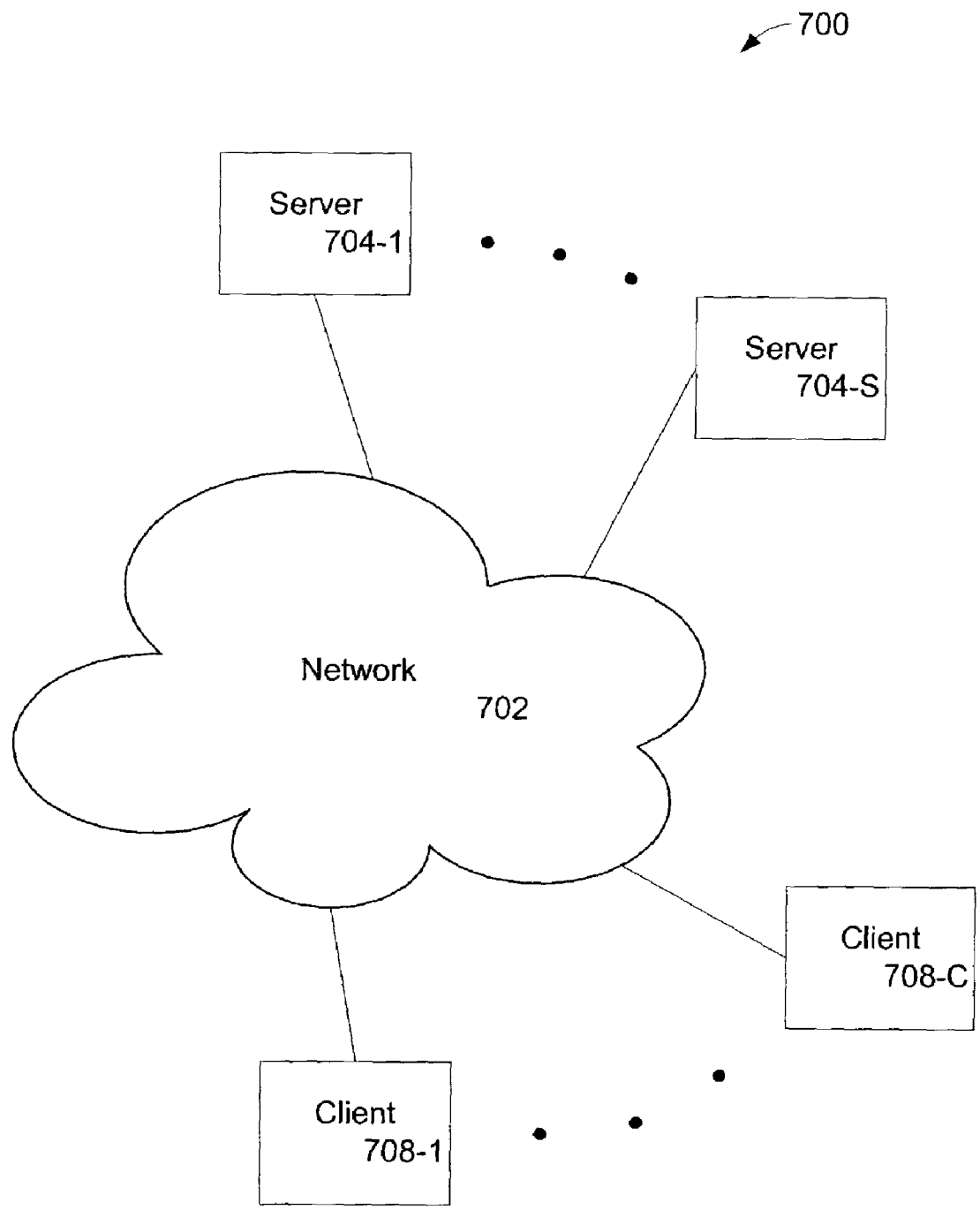
FIG. 7 illustrates a network environment in which the method and apparatus of the invention may be implemented.

FIG. 7 illustrates a network environment 700 in which the techniques described may be applied. The network environment 700 has a network 702 that connects S servers 704-1 through 704-S, and C clients 708-1 through 708-C. As shown, several systems in the form of S servers 704-1 through 704-S and C clients 708-1 through 708-C are connected to each other via a network 702, which may be, for example, an on-chip communication network. Note that alternatively the network 702 might be or include one or more of: inter-chip communications, an optical network, the Internet, a Local Area Network (LAN), Wide Area Network (WAN), satellite link, fiber network, cable network, or a combination of these and/or others. The servers may represent, for example: a master device on a chip; a memory; an intellectual property core, such as a microprocessor, communications interface, etc.; a disk storage system; and/or computing resources. Likewise, the clients may have computing, storage, and viewing capabilities. The method and apparatus described herein may be applied to essentially any type of communicating means or device whether local or remote, such as a LAN, a WAN, a system bus, on-chip bus, etc. It is to be further appreciated that the use of the term client and server is for clarity in specifying who initiates a communication (the client) and who responds (the server). No hierarchy is implied unless explicitly stated. Both functions may be in a single communicating device, in which case the client-server and server-client relationship may be viewed as peer-to-peer. Thus, if two devices such as 708-1 and 704-S can both initiate and respond to communications, their communication may be viewed as peer-to-peer. Likewise, communications between 704-1 and 704-S, and 708-1 and 708-C may be viewed as peer to peer if each such communicating device is capable of initiation and response to communication.

Figure 8:
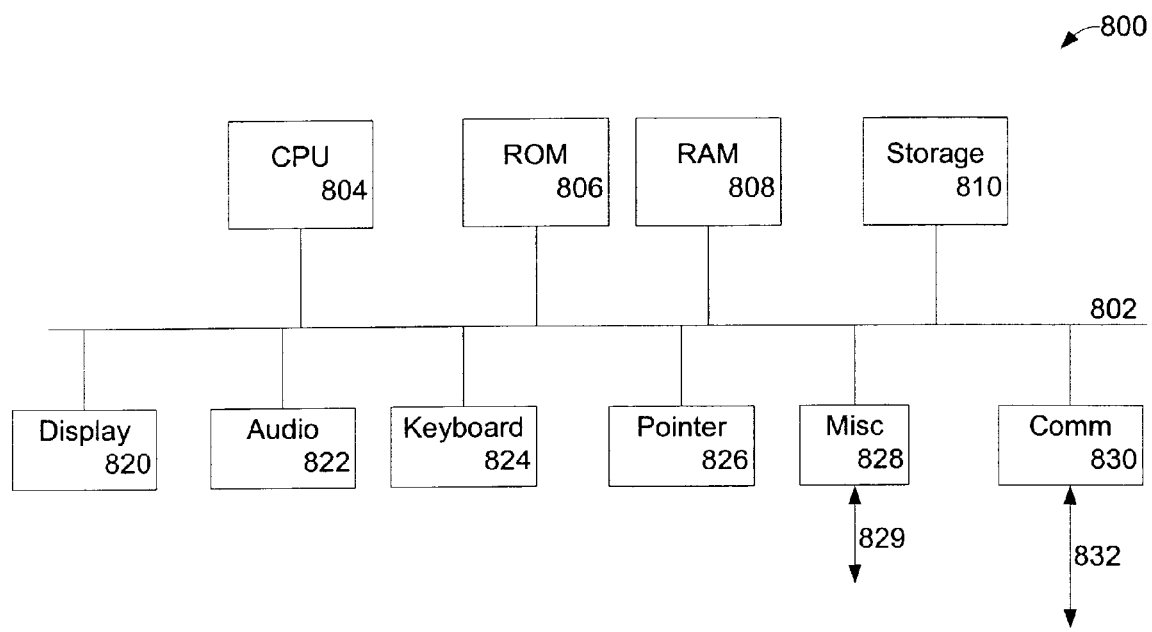
FIG. 8 is a block diagram of a computer system in which the method and apparatus of the invention may be implemented.

FIG. 8 illustrates a computer system 800 in block diagram form, which may be representative of any of the clients and/or servers shown in FIG. 7. The block diagram is a high level conceptual representation and may be implemented in a variety of ways and by various architectures. Bus system 802 interconnects a Central Processing Unit (CPU) 804, Read Only Memory (ROM) 806, Random Access Memory (RAM) 808, storage 810, display 820, audio, 822, keyboard 824, pointer 826, miscellaneous input/output (I/O) devices 828, and communications 830. The bus system 802 may be for example, one or more of such buses as an on-chip bus, a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 804 may be a single, multiple, or even a distributed computing resource. Storage 810, may be Compact Disc (CD), Digital Versatile Disk (DVD), hard disks (HD), optical disks, tape, flash, memory sticks, video recorders, etc. Display 820 might be, for example, a Cathode Ray Tube (CRT), Liquid Crystal Display (LCD), a projection system, Television (TV), etc. Note that depending upon the actual implementation of the system, the system may include some, all, more, or a rearrangement of components in the block diagram. For example, an on-chip communications system on an integrated circuit may lack a display 820, keyboard 824, and a pointer 826. Another example may be a thin client might consist of a wireless hand held device that lacks, for example, a traditional keyboard. Thus, many variations on the system of FIG. 8 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "communicating" or "displaying" or the like, can refer to the action and processes of a computer system, or an electronic device, that manipulates and transforms data represented as physical (electronic) quantities within the electronic device or computer system's registers and memories into other data similarly represented as physical quantities within the electronic device and/or computer system memories or registers or other such information storage, transmission, or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), digital versatile disk (DVD), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network. This communications network is not limited by size, and may range from, for example, on-chip communications to WANs such as the Internet.

The methods of the invention may be implemented using computer software. If written in a programming language conforming to a recognized standard, sequences of instructions designed to implement the methods can be compiled for execution on a variety of hardware platforms and for interface to a variety of operating systems. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical, or other form of propagated signals (e.g., carrier waves, infrared signals, digital signals, etc.); etc.

Thus, a method and apparatus for speculative response arbitration to improve system latency have been described.

What is claimed is:

1. A method comprising:
    receiving events; and
    granting a default bus request based on said events by predicting an occurrence of said default bus request, wherein said events are selected from the group consisting of expected or known delay between a request to a specific entity and a response from said specific entity for requests that have responses, knowledge about which entities are expected to send a response in reaction to requests that have been sent or are about to be sent, expected or known delay between request information and write data for a request, other expected or known system requests that occur as a reaction to others, and input received from another arbiter.

2. The method of claim 1 wherein said granting is not based on a current or pending bus request.

3. The method of claim 1 further comprising:
    receiving a plurality of bus requests;
    determining a characteristic from said plurality of received bus requests; and
    granting said default bus request based on said characteristic.

4. The method of claim 1 wherein said events are further selected from the group consisting of a most likely unit to request access next, a priori information, system information, and dynamically generated information.

5. The method of claim 1 wherein said granted default bus request allows a device to communicate via a bus granted without first requesting said bus.

6. The method of claim 1 wherein said granted default bus request occurs substantially simultaneously with a device's requesting a bus that was granted by said default bus request.

7. A processing system comprising a processor, which when executing a set of instructions performs the method of claim 1.

8. A machine-readable medium having stored thereon instructions, which when executed performs the method of claim 1.

9. A method comprising granting a default bus request based on an event selected from the group consisting of a most likely unit to request access next, expected or known delay between a request to a specific entity and a response from said specific entity for requests that have responses, knowledge about which entities are expected to send a response in reaction to requests that have been sent or are about to be sent, expected or known delay between request information and write data for a request, other expected or known system requests that occur as a reaction to others, input received from another arbiter, a priori information, system information, and dynamically generated information.

10. A processing system comprising a processor, which when executing a set of instructions performs the method of claim 9.

11. A machine-readable medium having stored thereon instructions, which when executed performs the method of claim 9.

12. A method comprising:
receiving communications from one or more arbiters; and
granting a default bus request based on said received communications by predicting an occurrence of said default bus request, wherein said communications are selected from the group consisting of expected or known delay between a request to a specific entity and a response from said specific entity for requests that have responses, knowledge about which entities are expected to send a response in reaction to requests that have been sent or are about to be sent, expected or known delay between request information and write data for a request, other expected or known system requests that occur as a reaction to others, and input received from another arbiter.

13. The method of claim 12 wherein said granting is not based on a current or pending bus request.

14. An apparatus comprising:
a means for receiving events; and
a means for granting a default bus request based on said events by predicting an occurrence of said default bus request, wherein said events are selected from the group consisting of expected or known delay between a request to a specific entity and a response from said specific entity for requests that have responses, knowledge about which entities are expected to send a response in reaction to requests that have been sent or are about to be sent, expected or known delay between request information and write data for a request, other expected or known system requests that occur as a reaction to others, and input received from another arbiter.

15. An apparatus comprising:
a means for granting a default bus request based on an event selected from the group consisting of a most likely unit to request access next, expected or known delay between a request to a specific entity and a response from said specific entity for requests that have responses, knowledge about which entities are expected to send a response in reaction to requests that have been sent or are about to be sent, expected or known delay between request information and write data for a request, other expected or known system requests that occur as a reaction to others, input received from another arbiter, a priori information, system information, and dynamically generated information.

16. An apparatus comprising:
a means for receiving communications from one or more arbiters; and
a means for granting a default bus request based on said received communications by predicting an occurrence of said default bus request, wherein said communications are selected from the group consisting of expected or known delay between a request to a specific entity and a response from said specific entity for requests that have responses, knowledge about which entities are expected to send a response in reaction to requests that have been sent or are about to be sent, expected or known delay between request information and write data for a request, other expected or known system requests that occur as a reaction to others, and input received from another arbiter.

17. An apparatus comprising:
a distributed arbiter having an input to receive communications from one or more arbiters, wherein the distributed arbiter also having logic to grant a default bus request based on said received communications by predicting an occurrence of said default bus request, wherein said communications are selected from the group consisting of expected or known delay between a request to a specific entity and a response from said specific entity for requests that have responses, knowledge about which entities are expected to send a response in reaction to requests that have been sent or are about to be sent, expected or known delay between request information and write data for a request, other expected or known system requests that occur as a reaction to others, and input received from another arbiter.

* * * * *